United States Patent

Motohashi

[11] Patent Number: 6,122,330
[45] Date of Patent: Sep. 19, 2000

[54] DIVERSITY COMBINING

[76] Inventor: Teruyuki Motohashi, c/o NEC Shizuoka, Ltd., 4-2, Shimomata, Kakegawa-shi, Shizuoka, Japan

[21] Appl. No.: 08/932,866

[22] Filed: Sep. 18, 1997

[30] Foreign Application Priority Data

Sep. 18, 1996 [JP] Japan .................................. 8-246621

[51] Int. Cl.[7] .............................. H04B 7/02; H04L 27/156
[52] U.S. Cl. ........................... 375/335; 375/347; 455/135
[58] Field of Search ................................ 375/267, 335, 375/347, 334; 455/280, 135

[56] References Cited

U.S. PATENT DOCUMENTS

| 5,844,952 | 12/1998 | Ito et al. | 375/347 |
| 5,937,005 | 8/1999 | Obuchi et al. | 375/224 |

FOREIGN PATENT DOCUMENTS

| 64-58043 | 3/1989 | Japan . |
| 4-335733 | 11/1992 | Japan . |
| 5-250058 | 9/1993 | Japan . |
| 6-334572 | 2/1994 | Japan . |
| 8-115156 | 5/1996 | Japan . |
| 8-161909 | 6/1996 | Japan . |
| 8-167887 | 6/1996 | Japan . |
| 9-298566 | 11/1997 | Japan . |

*Primary Examiner*—Amanda T. Le
*Attorney, Agent, or Firm*—Scully, Scott Murphy & Presser

[57] ABSTRACT

A radio receiver receives a plurality of 4-ary FSK signal replicas and detects a four-level detected signal from each 4-FSK signal replica. The four-level detected signal is sampled by an AD converter. When a first signal replica is received before a second signal replica, a first distance between a first sample value and an input center level of the AD converter and a second distance between a second sample value and the input center level are calculated. The first sample value corresponds to the first sample value in the first and second signal replicas, respectively. One of the first sample value and the second sample value is selected depending on which one of the first and second distances is larger than the other.

16 Claims, 5 Drawing Sheets

15 CYCLES FOR 60 MIN.

| CYCLE #0 | CYCLE #1 | CYCLE #2 | ....... | CYCLE #14 |
|---|---|---|---|---|

CYCLE=128 FORMS FOR 4 MIN.

| F#0 | F#1 | F#2 | F#3 | ....... | F#126 | F#127 |
|---|---|---|---|---|---|---|

FRAME FOR 1.875 SEC.

| SYNC | BLOCK #0 | BLOCK #1 | ....... | BLOCK #10 |
|---|---|---|---|---|

115MSEC

| SYNC SECTION(S1) | FRAME INFO | SYNC SECTION(S2) |
|---|---|---|

FIG. 5

DIVERSITY COMBINING

BACKGROUND OF THE INVENTION

1. Field of the Invention

The present invention relates to diversity techniques and, more specifically, to a diversity combining technique for use in a multi-level digital-modulated signal receiver such as a 4-ary FSK (frequency Shift Keying) receiver.

2. Description of the Related Art

There have been proposed several diversity techniques in order to achieve high quality in signal transmission even in radio communications on fading channels. For example, a radio selective call receiver having a time diversity function has been disclosed in Japanese Patent Unexamined Publication No. 6-334572.

According to the above conventional receiver, when a plurality of signal replicas are received at different arrival times, the absolute value of a sampled signal in a currently received replica is compared with that of the corresponding sampled signal in a previously received replica in symbols, and then one which is greater than the other is selected to produce a resultant sample sequence. Since the sample selection is performed based on the output signal of a detector, the conventional time diversity technique has an advantage that the time diversity is performed without the need of a specific detector for detecting received signal strength.

SUMMARY OF THE INVENTION

In recent years, as one measure to accommodate the increasing transmission rate, a multi-level digital modulation technique such as M-ary FSK (frequency shift keying) comes to be employed. Especially, the 4-ary FSK modulation format is used in many wireless applications. Since the multi-level digital modulation allows a larger amount of data to be transmitted, an increased length of messenger can be transmitted at a time to a radio selective call receiver such as a pager.

However, the conventional time diversity technique as described above can be realized on the premise that the modulation scheme is the binary FSK. Therefore, the conventional technique cannot be applied to the case of multi-level digital modulation scheme such as M-ary FSK.

An object of the present invention is to provide a diversity combining method which can provide the maximum diversity gain in multi-level digital modulation scheme.

Another object of the present invention is to provide a radio selective call receiver which can receive a multi-level digital modulated signal by using the time diversity technique.

According to the invention, the distance between a multi-level sampled signal and a predetermined reference level is calculated for each of two received signal replicas. By comparing the respective distances, one of the multi-level detected signals is selected depending on which one of the calculated distances is larger. Since the selection of sampled signals is performed based on the respective calculated distances, the maximum diversity gain can be obtained in multi-level digital modulation scheme.

In a radio receiver for receiving a plurality of signal replicas each being modulated according to a multi-level digital modulation, after detecting a signal component from each signal replica, the signal component varying in amplitude, the signal component is sampled in synchronization with the signal component to produce a sample value. A first distance between a first sample value and a predetermined level and a second distance between a second sample value and the predetermined level are calculated. The first sample value is produced from a first signal replica, and the second sample value is produced from a second signal replica and corresponding to the first sample value. The predetermined level is a center level of a predetermined range where the signal component varies in amplitude. When the first and second distances are calculated, one of the first sample value and the second sample value is selected depending on which one of the first and second distances is larger than the other.

DESCRIPTION OF THE PREFERRED EMBODIMENT

Figure 1:
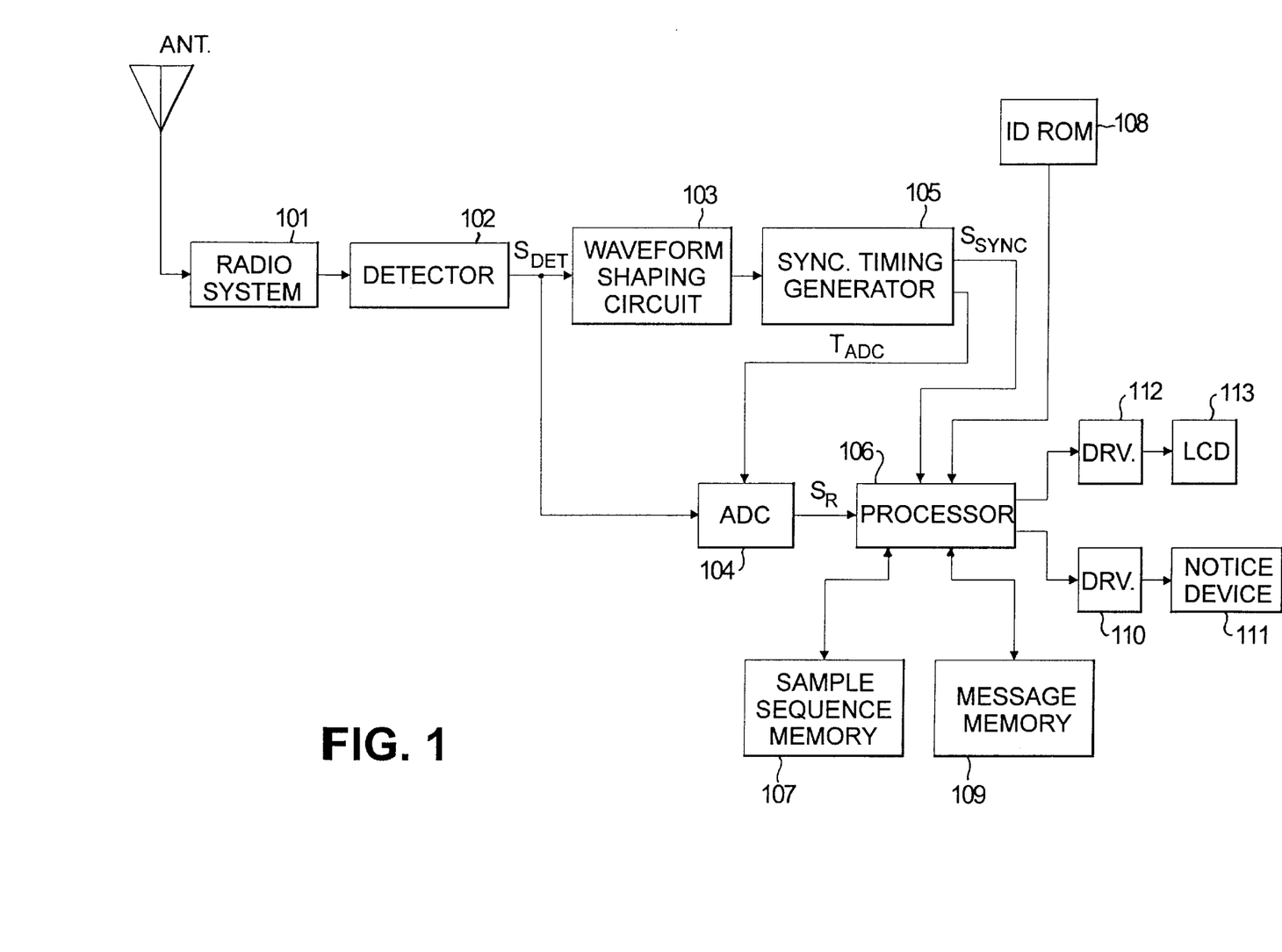
FIG. 1 is a block diagram showing a radio selective call receiver to which the present invention can be applied.

Referring to FIG. 1, a radio system 101 receives a radio signal from a radio base station (not shown) of a radio communications system through an receiving antenna. Here, the radio communications system provides time diversity by transmitting the same radio signal M (M≧2) times. Therefore, the radio system 101 receives M signal replicas at different arrival times. The radio system 101 amplifies the received signal and outputs it to a detector 102 such as a frequency-discriminator detector. The detected signal $S_{DET}$ produced by the detector 102 is output to both a waveform shaping circuit 102 and an analog-to-digital converter (ADC) 104.

The waveform shaping circuit 103 shapes the wave form of the detected signal $S_{DET}$ by comparing the detected signal $S_{DET}$ with a predetermined reference voltage to produce a waveform-shaped signal. A synch timing generator 105 generates a sync timing signal $S_{SYNC}$ synchronizing with the detected signal $S_{DET}$ and outputs it to a processor (or CPU) 106. The sync timing generator 105 further generates an ADC timing signal $T_{ADC}$ synchronizing with the sync timing signal $S_{SYNC}$ and outputs it to the ADC 104.

The ADC 104 samples and holds the detected signal $S_{DET}$ according to the ADC timing signal $T_{ADC}$, and converts the sampled signal to a digital signal $S_R$. The ADC 104 has a predetermined input dynamic range. As will be described later, the center of the ADC input dynamic range is used for diversity combining according to the present invention.

The processor 106 performs the offset canceling of the digital signal $S_R$, the diversity combining, and the message processing. These functions are provided by a control program stored in a ROM (not shown).

The offset canceling function compensates for level offset of sampled signal caused by a mismatch between the channel frequency and the local oscillation frequency which is used to covert the channel frequency to an intermediate frequency. If they were completely matched, the level of sampled signal would be coincident with one of four levels corresponding to 00, 01, 10, and 11, respectively. Actually, however, there are some frequency deviations causing the level offset of sampled signal. It is necessary to cancel the level offset of sample signal before the diversity combining and the reproduction of original data. After the offset cancel, a samples sequence of the digital signal $S_R$ is subject to the diversity coming using a sample sequence memory 107.

The diversity coming is performed by comparing a currently received sample sequence with a stored sample sequence in samples to produce a combined sample sequence in the sample sequence memory 107. The details of diversity coming will be described later.

After the final signal replica have been received, a sample sequence stored in the sample sequence memory 107 is used to perform the four-level decision. Based on the results of the four-level decision, original transmission data is reproduced.

After the original transmission data is decoded into received data, the selective calling number included in the received data is compared with an identification (ID) number previously stored in an ID read-only memory (ROM) 108. When the selective calling number included in the received data is identical to the ID number, a received message included in the received data is stored onto a message memory (RAM) 109. The processor 106 controls a driver 110 such that a notice device 111 such as a sounder informs a user of an incoming call and further controls a display driver 112 such that the received message is displayed on a liquid crystal display 113 depending on user's instructions. In this figure, a keypad for inputting user's instructions is not shown.

RECEIVING OPERATION

Figure 2:
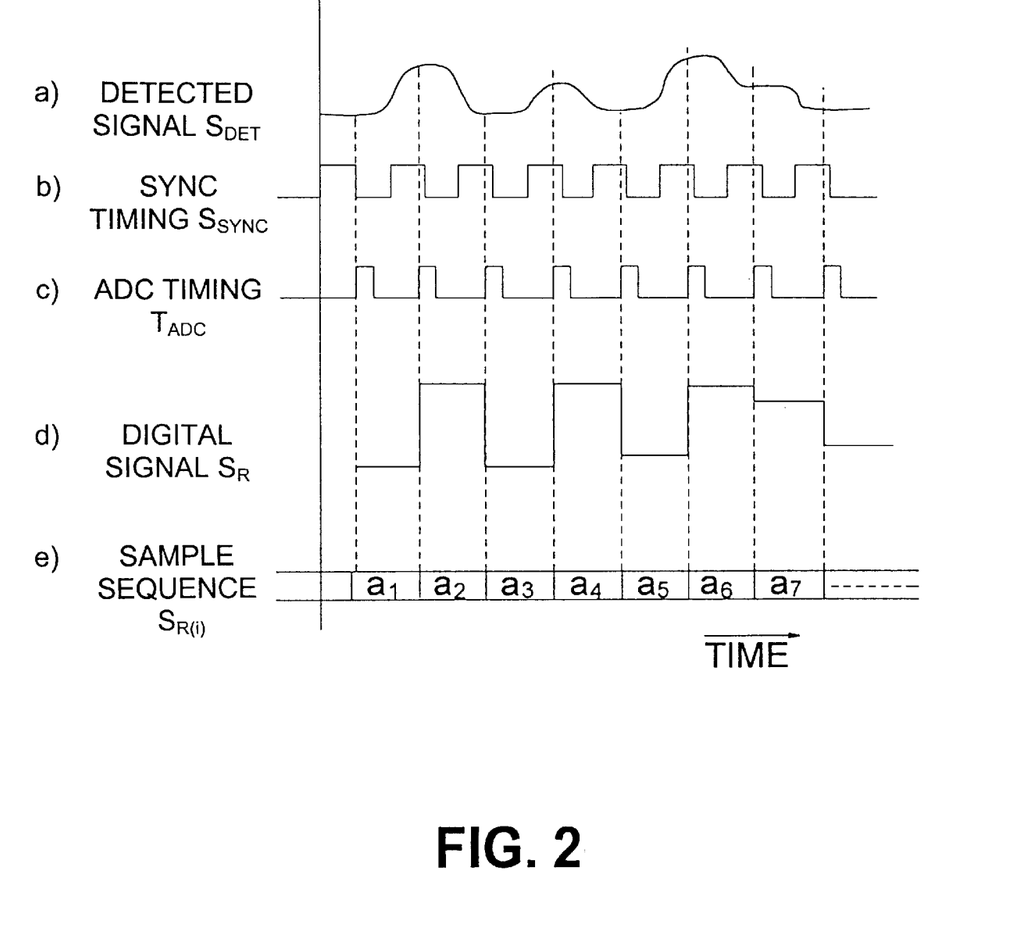
FIG. 2 is a time chart showing an operation of the radio selective call receiver according to an embodiment of time diversity combining method according to the present invention.

Referring to FIG. 2, there are shown schematic wave forms and signal timing according to an embodiment of the present invention. The detected signal $S_{DET}$ is detected from the 4-ary FSK-modulated signal by the detector 102 as shown in (a) of FIG. 2. The waveform shaping circuit 103 compared the detected signal $S_{DET}$ with a predetermined reference voltage to produce a binary waveform-shaped signal. When receiving the binary waveform-shaped signal, the sync timing generator 105 generates the sync timing signal $S_{SYNC}$ synchronizing therewith as shown in (b) of the grid and further generates the ADC timing signal $T_{ADC}$ in synchronization with the synch timing signal $S_{SYNC}$ as shown in (c) of the figure.

The ADC 104 samples and holds the detected signal $S_{DET}$ according to the ADC timing signal $T_{ADC}$, and converts each sampled voltage of the detected signal $S_{DET}$ to the digital signal $S_R$. The digital signal $S_R$ is a digital signal but is shown in an analog fashion in (d) of the figure for the sake of clarity.

In this manner, the sampled values $a_1, a_2, a_3, \ldots$ of the digital signal $S_R$ are sequentially obtained as shown in (e) of the figure.

DIVERSITY COMBINING

Figure 3:
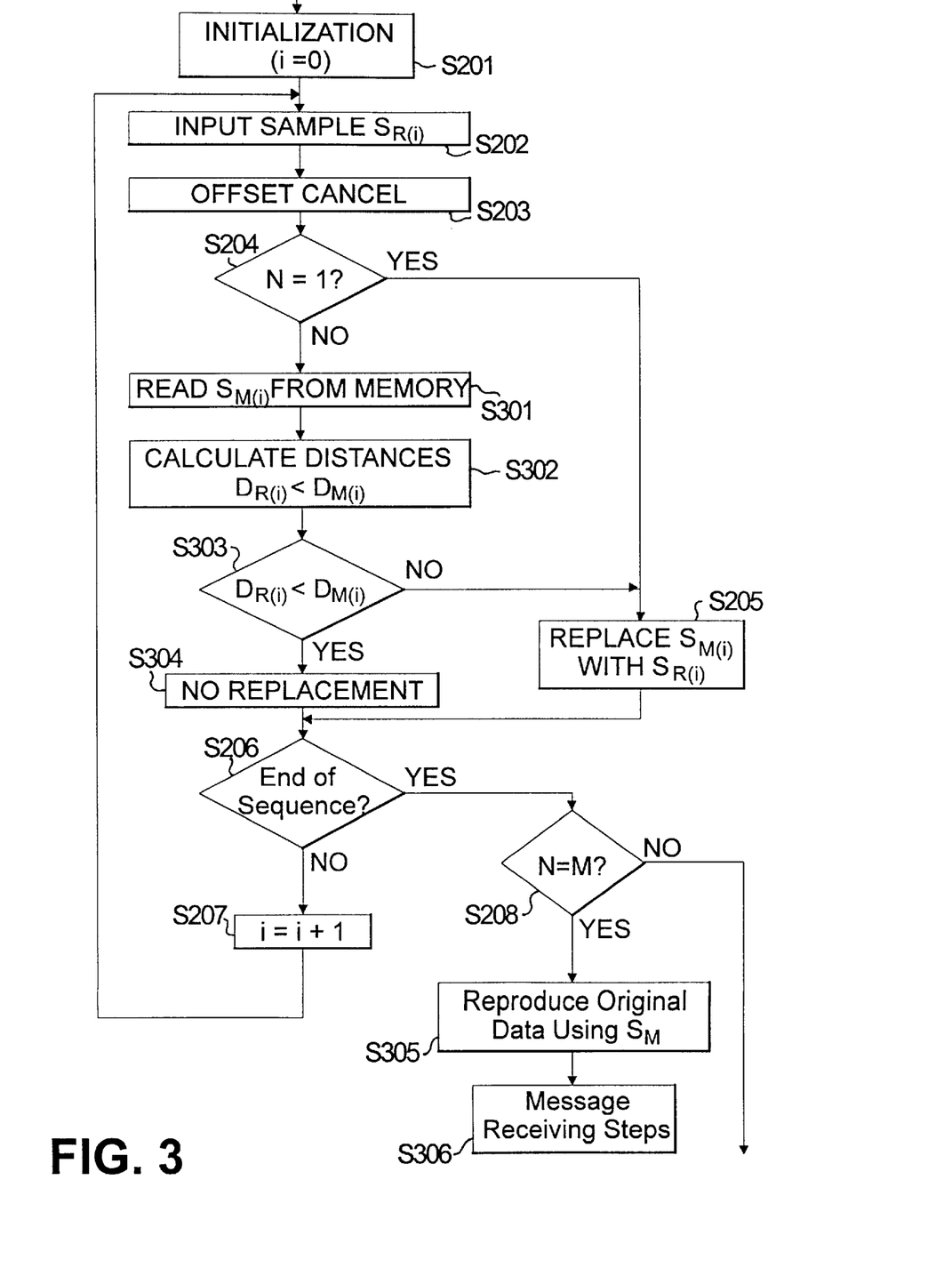
FIG. 3 is a flow chart showing the time diversity combining method according to the embodiment.

Referring to FIG. 3, after initializing a variable i (step S201), the processor 106 inputs a digital signal sample value $S_{R(i)}$ from the ADC 104 (step S202) and performs the offset canceling (step S203). More specifically, the offset canceling is performed by the following steps. First, the processor 106 determines which level of the four predetermined levels corresponds to the sample values $S_{R(i)}$. And the sample value $R_{R(i)}$ is compared with the corresponding level to produce the level difference between them. Based on the level difference and the previous level differences, the offset component of the sample value $S_{R(i)}$ is compensated.

Subsequently, the processor 106 checks whether the number of reception times, N, is 1 (step S204). In other words, it is checked whether the sample value $S_{R(i)}$ is produced from the first one of M signal replicas received from the radio base station. When N=1 (YES in step S204), the sample value $S_{R(i)}$ is stored onto the sample sequence memory 107 (step S205) and then it is checked whether the sample value $S_{R(i)}$ is the last sample (S206). When it is not the last one (NO in step S206), the variable 1 is incremented (step S207) and control goes back to the step S202. In this manner, the steps S202–S207 are repeated until all the sample values of the first received signal replica (N=1) have been stored onto the sample sequence memory 107. The sample value $S_{R(i)}$ stored in the sample sequence memory 107 is hereinafter referred to as a stored sample value $S_{H(i)}$. Thereafter, it is checked whether N reaches M, that is, the last signal replica is received (step S208), and, when N is smaller than M (NO in step S208), the precessor 106 waits for the next signal replica.

In the case where a sample value of a subsequent signal replica is input and its offset is canceled (steps S201–S203 and NO in step S204), the processor 106 reads the corresponding stored sample value $S_{H(i)}$ from the sample sequence memory 107 (step S301), and then calculates the distance $D_{R(i)}$ and $D_{H(i)}$ which are deviations of the sample value $S_{R(i)}$ and the stored sample value $S_{R(i)}$ from the center level TH of the ADC input dynamic range, respectively (step S302). The details of the distance calculation will be described referring to FIG. 4.

When calculating the distances $D_{R(i)}$ and $D_{H(i)}$, the processor 106 determines whether the distance $D_{R(i)}$ of the received sample value $S_{R(i)}$ is smaller than the distance $D_{H(i)}$ of the stored sample value $S_{H(i)}$ (step S303). When the distance $D_{R(i)}$ is not smaller than the distance $D_{H(i)}$ (NO in step S303), the stored sample vale $S_{H(i)}$ is replaced with the received sample value $S_{R(i)}$ (step S205). Contrarily, when the received sample distance $D_{R(i)}$ is smaller than the stored sample distance ($D_{H(i)}$ (YES in step S303), the stored sample value $S_{H(i)}$ is not replaced (step S304). In other words, one whose calculated distance is larger is selected and stored in the sample sequence memory 107. In this manner, the steps S202–S204, S301–S304 and S205–S207 are repeated until all the sample values of a received signal replica (N≠1 ) have been checked. And further, the steps are repeated while updating the sample sequence memory 107 until all the sample values of the last signal replica has been checked.

When N is equal to M, that is, the last signal replica has been checked (YES in step S208), the processor 106 uses the sample sequence stored in the sample sequence memory 107 to reproduce the original transmission data (step S305) and then performs the message receiving steps including the decoding, the ID checking, the notification and the message displaying (step S306).

DISTANCE CALCULATION

Figure 4:
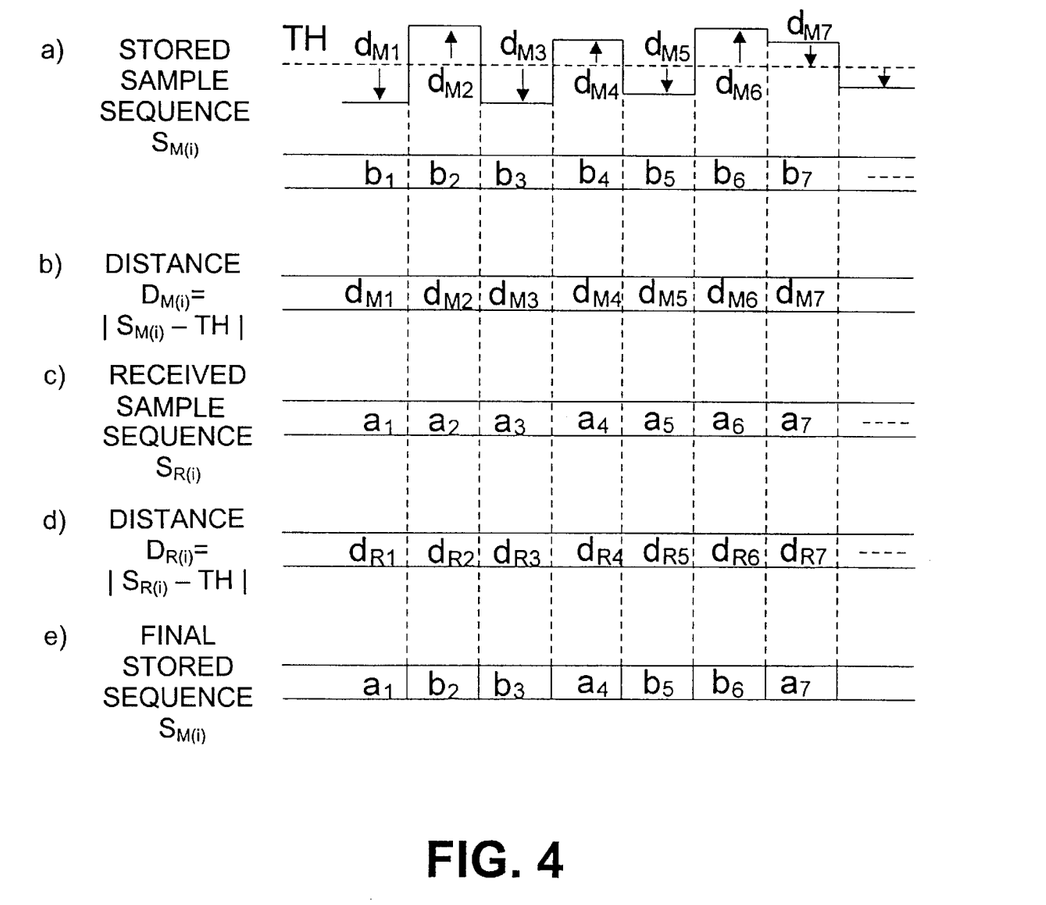
FIG. 4 is a time chart showing the time diversity combining method according to the embodiment.

As shown in FIG. 4, assuming that the stored sample value sequence $S_{H(i)}$ are $b_1, b_2, b_3, \ldots$ which are stored in the sample sequence memory 107 as shown in (a) of the figure. When sequentially receiving the received sample values $a_1, a_2, a_3, \ldots$ as shown in (c) of the figure, the processor 106 sequentially calculates the distance $D_{H(i)}$ and the distance $D_{R(i)}$.

More specifically, the distance $D_{H(i)}$ is calculated by $|S_{H(i)}-TH|$ as shown in (b) of the figure and the distance $D_{R(i)}$ is calculated $|S_{R(\leq)}-TH|$ as shown in (d) of the figure, where TH is the center level of the ADC input dynamic range. For example, when inputting the sample value $S_{R(1)}=a_1$, the corresponding stored sample value $S_{H(1)}=b_1$ is read and then the respective distances $D_{H(1)}=|S_{H(1)}-TH|=d_{H1}$ and $D_{R(1)}=|S_{R(1)}-TH|=d_{R1}$ are calculated. When $D_{H(1)}=<D_{R(1)}$, the sample value $S_{R(1)}=a_1$ is selected and the stored sample value $S_{H(1)}=b_1$ is replaced with the sample value $S_{R(1)}=a_1$. Contrarily, when $D_{H(1)}>D_{R(1)}$, the stored sample value $S_{H(1)}=b_1$ remains in the sample sequence memory 107. In this manner, one of the received and the stored sample values is selected by comparing and calculated distances for each sampling timing. An example of the final stored sequence in the sample sequence memory 107 is shown in (e) of FIG. 14.

Figure 5:
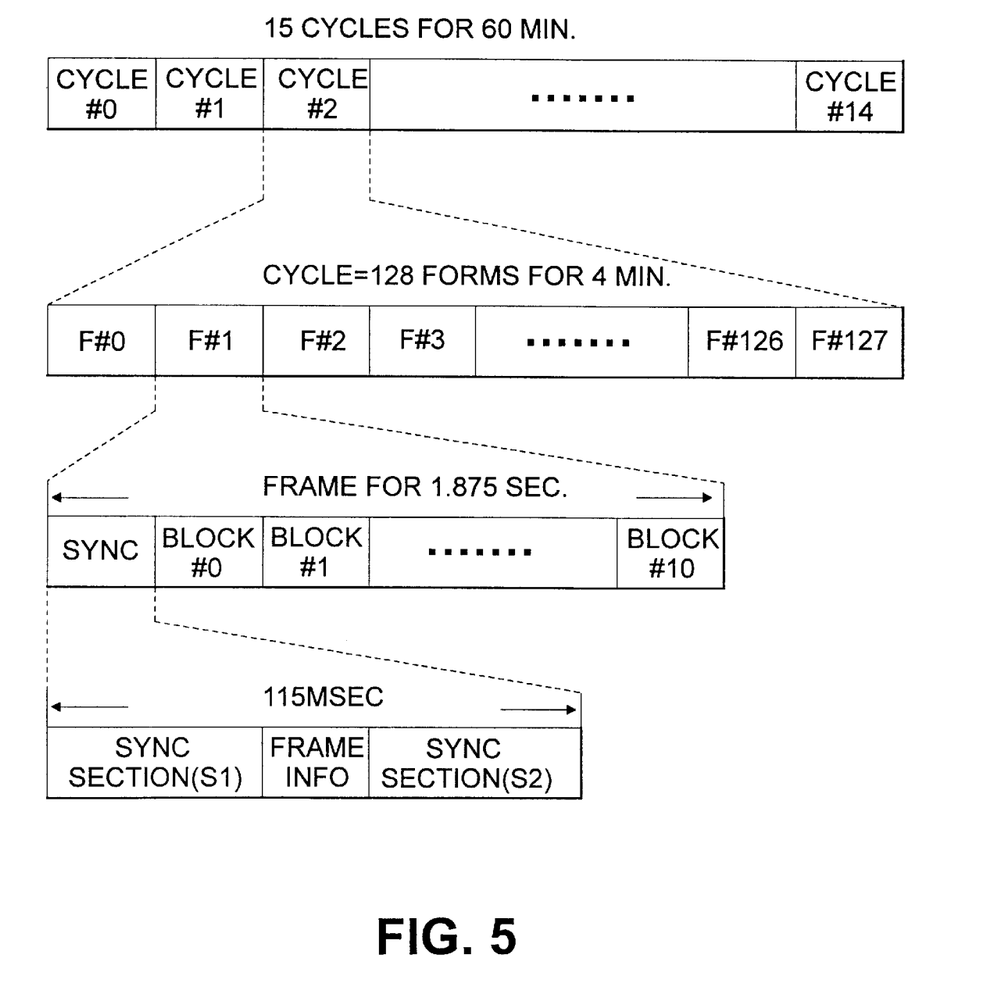
FIG. 5 is a diagram showing an example of a signal format which can be used in the embodiment.

Referring to FIG. 5, a radio base station transmits a transmission signal having a predetermined signal format, for example, according to RCR STD-43 (or FLEX-TD system) standardized defined by Research and Development Center for Radio Systems (RCR). More specifically, 15 cycles numbered from 0 to 14 are transmitted for 60 minutes, each cycle consisting of 128 frames numbered from 0 to 127 for four minutes. Each frame consists of a synchronization signal (Sync) and 11 blocks numbered from 0 to 10. The synchronization signal (Sync) consists of a first synch section (S1), a frame information section, and a second sync section (S2). The frame information section includes a frame number, a cycle number, a multiple transmission indicator and a field.

What is claimed is:

1. In a radio receiver for receiving a plurality of signal replicas each being modulated according to a multi-level digital modulating, a diversity combining method comprising the steps of:
    a) detecting a signal component from each signal replica, the signal component varying in amplitude;
    b) sampling the signal component in synchronization with the signal component to produce a sample value;
    c) determining a first distance between a first sample value and a predetermined level, the first sample value being produced from a first signal replica, and the predetermined level being a center level of a predetermined M-ary range where the first signal component varies in amplitude in accordance with M-ary FSK multilevel digital modulation;
    d) determining a second distance between a second sample value and the predetermined level, the second sample value being produced from a second signal replica and corresponding to the first sample value; and
    e) selecting one of the first sample value and the second sample value depending on which one of the first and second distances is larger than the other.

2. The diversity combining method according to claim 1, further comprising the steps of:
    f) producing a sequence of sample values using a sample value selected for each sampling timing; and
    g) determining a signal level for each selected sample value, the signal level being one of a plurality of levels predetermined according to the multi-level digital modulation.

3. The diversity combining method according to claim 1, wherein the step b) comprises the step of:
    b-1) sampling the signal component in synchronization with the signal component to produce a sample value;
    b-2) compensating for an offset of the sample value by comparing the sample value with one of a plurality of levels predetermined according to the multi-level digital modulation.

4. The diversity combining method according to claim 3, wherein the second signal replica is received after the first signal replica and the first sample value is stored in a memory,
    wherein the step e) comprises the steps of:
        comparing the first distance with the second distance;
        selecting the second sample value to replace the first sample value with the second sample value in the memory when the second distance is larger than the first distance; and
        selecting the first sample value stored in the memory when the first distance is larger than the second distance.

5. The diversity combining method according to claim 1, wherein the second signal replica is received after the first signal replica and the first sample value is stored in a memory,
    wherein the step e) comprises the steps of:
        comparing the first distance with the second distance;
        selecting the second sample value to replace the first sample value with the second sample value in the memory when the second distance is larger than the first distance; and
        selecting the first sample value stored in the memory when the first distance is larger than the second distance.

6. In a 4-ary FSK radio receiver for receiving a plurality of signal replicas each being modulated according to 4-ary FSK (frequency shift keying) modulation, a diversity combining method comprising the steps of:
    a) detecting a signal component from each signal replica, the signal component varying in amplitude;
    b) inputting the signal component to convert it into digital form in sampling timing in synchronization with the signal component to produce a sample value;
    c) calculating a first distance between a first sample value and a predetermined level, the first sample value being produced from a first signal replica, and the predetermined level being a center level of an input dynamic range in the step b);
    d) calculating a second distance between a second sample value and the predetermined level, the second sample value begin produced from a second signal replica and corresponding to the same sampling timing as the first sample value; and
    e) selecting one of the first sample value and the second sample value depending on which one of the first and second distances is larger than the other.

7. The diversity coming method according to claim 6, wherein the step b) comprises the step of:
    b-1) inputting the signal component within a predetermined input dynamic range;
    b-2) converting the signal component into digital form in sampling timing in synchronization with the signal component to produce a sample value; and
    b-3) compensating for an offset of the sample value by comparing the sample value with one of a plurality of levels predetermined according to the multi-level digital modulation.

8. The diversity combining method according to claim 6, wherein the second signal replica is received after the first signal replica and the first sample value is stored in a memory, wherein the step e) comprises the steps of:
comparing the first distance with the second distance;
selecting the second sample value to replace the first sample value with the second sample value in the memory when the second distance is larger than the first distance; and
selecting the first sample value stored in the memory when the first distance is larger than the second distance.

9. The diversity combining method according to claim 6, further comprising the steps of:
f) producing a sequence of sample values using a sample value selected for each sampling timing; and
g) determining a signal level for each selected sample value, the signal level being one of four levels predetermined according to the 4-ary FSK modulation.

10. A radio receiver for receiving a plurality of signal replicas each being modulated according to a multi-level digital modulating, comprising:
a detector for detecting a signal component from each signal replica, the signal component varying in amplitude;
an AD converter for converting the signal component to a digital sample value according to sampling timing in synchronization with the signal component;
a calculator for determining a first distance between a first sample value and a predetermined level, the first sample value being produced from a first signal replica, and the predetermined level being a center level of a predetermined M-ary range where the signal component varied in amplitude, and determining a second distance between a second sample value and the predetermined level, the second sample value being produced from a second signal replica and corresponding to the same sampling timing as the first sample value;
a selector for selecting one of the first sample value and the second sample value depending on which one of the first and second distances is larger than the other; and
a memory for storing a sequence of sample values using s elected sample value for each sampling timing.

11. The radio receiver according to claim 10, further comprising:
an offset canceler for canceling an offset of the sample value based on a difference between the sample value and one of a plurality of levels predetermined according to the multi-level digital modulation.

12. The radio receiver according to claim 10, further comprising:
a level decision section for determining a signal level for each selected sample value, the signal level being one of a plurality of levels predetermined according to the multi-level digital modulation.

13. The radio receiver according to claim 10, wherein the second signal replica is received after the first signal replica and the first sample value is stored in the memory, wherein the selector compares the first distance with the second distance, selecting the second sample value to replace the first sample value with the second sample value in the memory when the second distance is larger than the first distance, and selecting the first sample value stored in the memory when the first distance is larger than the second distance.

14. A 4-ary FSK radio receiver for receiving a plurality of signal replicas each being modulated according to a 4-ary FSK modulation, comprising:
a detector for detecting a signal component from each signal replica, the signal component varying the amplitude;
a synch generator for generating sampling timing in synchronization with the signal component;
an AD converter for converting the signal component to a digital sample value according to the sampling timing, the AD converter having an input dynamic range;
a processor for canceling an offset of the sample value based on a difference between the sample value and one of four levels determined according to the 4-ary FSK modulation, calculating a firs distance between a first sample value and a predetermined level, the first sample value being produced from a first signal replica, and the predetermined level being a center level of the input dynamic range of the AD converter, calculating a second distance between a second sample value and the predetermined level, the second sample value being produced from a second signal replica and corresponding to the same sampling timing as the first sample value, and selecting one of the first sample value and the second sample value depending on which one of the first and second distances is larger than the other; and
a memory for storing a sequence of sample values using a selected sample value for each sampling timing.

15. The 4-ary FSK radio receiver according to claim 14, wherein the processor determines a signal level for each selected sample value, the signal level being one of the levels determined according to the 4-ary FSK modulation and reproducing an original data from the signal level for each selected sample value.

16. The 4-ary FSK radio receiver according to claim 14, wherein the second signal replica is received after the first signal replica and the first sample value is stored in the memory, wherein the selector compares the first distance with the second distance, selecting the second sample value to replace the first sample value with the second sample value in the memory when the second distance is larger than the first distance, and selecting the first sample value stored in the memory when the first distance is larger than the second distance.

* * * * *

UNITED STATES PATENT AND TRADEMARK OFFICE
CERTIFICATE OF CORRECTION

PATENT NO. : 6,122,330
DATED : September 19, 2000
INVENTOR(S) : T. Motohashi

It is certified that error appears in the above-identified patent and that said Letters Patent is hereby corrected as shown below:

Column 4,
Line 19, "$S_{H(i)}\bullet$" should read -- $S_{M(i)}\bullet$ --
Line 27, "$S_{H(i)}\bullet$" should read -- $S_{M(i)}\bullet$ --
Line 29, "distance" should read -- distances --
Line 29, "$D_{M(i)}$" should read -- $D_{H(i)}$ --
Line 30, "$S_{R(i)}$" should read -- $S_{M(i)}$ --
Line 35, "$D_{H(i)}$" should read -- $D_{M(i)}$ --
Line 37, "$D_{H(i)}$" should read -- $D_{M(i)}$ --
Line 38, "$D_{H((i)}$" should read -- $D_{M(i)}$ --
Line 39, "$D_{H(i)}$" should read -- $D_{M(i)}$ --
Line 40, "vale $S_{H(i)}$" should read -- valve $S_{M(i)}$ --
Line 43, "($D_{H(i)}$" should read -- $D_{M(i)}$ --
Line 44, "$S_{H(i)}$" should read -- $S_{M(i)}$ --
Line 62, "$S_{H(i)}$" should read -- $S^{M(i)}$ --
Line 66, "$D_{H(i)}$" should read -- $D_{M(i)}$ --

Column 5,
Line 1, "$D_{H(i)}$" should read -- $D_{M(i)}$ --
Line 2, "$S_{H(i)}$" should read -- $S_{M(i)}$ --
Line 6, "$S_{H(1)}$" should read -- $S_{M(i)}$ --
Line 7, "$D_{H(i)}=\bullet S_{H(1)}-TH\bullet=d_{H(1)}$" should read -- $D_{M(i)}=\bullet S_{M(i)}-TH\bullet=d_{M(i)}$ "
Line 8, "$D_{H(1)}$" should read -- $D_{M(i)}$ --
Line 10, "$S_{H(1)}$" should read -- $S_{M(i)}$ --
Line 11, "$D_{H(1)}$" should read -- $D_{M(i)}$ --
Line 12, "$S_{H(1)}$" should read -- $S_{M(i)}$ --

Column 7,
Line 40-41, claim 10, "using s elected" should read -- using a selected --

UNITED STATES PATENT AND TRADEMARK OFFICE
CERTIFICATE OF CORRECTION

PATENT NO. : 6,122,330
DATED : September 19, 2000
INVENTOR(S) : T. Motohashi

It is certified that error appears in the above-identified patent and that said Letters Patent is hereby corrected as shown below:

Column 8,
Line 25, claim 14, "firs" should read -- first --

Signed and Sealed this

Eleventh Day of December, 2001

Attest:

NICHOLAS P. GODICI
Attesting Officer    Acting Director of the United States Patent and Trademark Office

UNITED STATES PATENT AND TRADEMARK OFFICE
CERTIFICATE OF CORRECTION

PATENT NO. : 6,122,330
DATED : September 19, 2000
INVENTOR(S) : T. Motohashi

It is certified that error appears in the above-identified patent and that said Letters Patent is hereby corrected as shown below:

<u>Title page,</u>
Insert -- [73] Assignee: NEC Corporation, Tokyo, Japan --.

Signed and Sealed this

Fourteenth Day of May, 2002

Attest:

Attesting Officer

JAMES E. ROGAN
*Director of the United States Patent and Trademark Office*